US United States Patent [19]

Kvasnikoff et al.

[11] 4,436,716

[45] Mar. 13, 1984

[54] PROCESS FOR THE PRODUCTION OF SULPHUR WITH INCREASED ENERGY RECOVERY FROM A GAS CONTAINING $H_2S$, $SO_2$, $H_2$ AND/OR CO

[75] Inventors: Georges Kvasnikoff, Monein; Robert Voirin, Mourenx, both of France

[73] Assignee: Societe Nationale Elf Aquitaine (Production), Paris, France

[21] Appl. No.: 320,846

[22] Filed: Nov. 12, 1981

[30] Foreign Application Priority Data

Nov. 17, 1980 [FR] France ................................ 80 24324

[51] Int. Cl.$^3$ .............................................. C01B 17/04
[52] U.S. Cl. ................................. 423/574 R; 423/247; 423/248
[58] Field of Search ................ 423/573.6, 574 R, 247, 423/248, 576

[56] References Cited

U.S. PATENT DOCUMENTS 3,845,197  10/1974  Renault et al. ....................... 423/576
4,138,473   2/1979  Gieck .................................... 423/576

Primary Examiner—Earl C. Thomas
Attorney, Agent, or Firm—Burgess, Ryan & Wayne

[57] ABSTRACT

Improved process for the production of sulphur from a gas containing $H_2S$, $SO_2$, $H_2$ and/or CO, in which the gas is caused to pass through a CLAUS catalyst in a primary catalytic stage operating at between 200° and 460° C. in order to form sulphur, and thereafter the sulphur contained in the reaction mixture issuing from this stage is condensed through indirect heat exchange with water to produce steam.

The improved process consists in constituting at least the final eighth of the catalyst volume in this stage by a composite mass formed from a refractory oxide on which is fixed a transition metal compound, for example Co and/or Mo, and in entering into contact the gas with this composite mass at between 300° and 460° C. in order to oxidize $H_2$ and CO.

The energy resulting from this oxidation is recovered in the form of a supplementary quantity of steam during the sulphur condensation.

26 Claims, No Drawings

PROCESS FOR THE PRODUCTION OF SULPHUR WITH INCREASED ENERGY RECOVERY FROM A GAS CONTAINING H₂S, SO₂, H₂ AND/OR CO

The invention concerns an improved process for the production of sulphur, with increased energy recovery, from a gas containing $H_2S$, $SO_2$ and at least one compound selected from $H_2$ and CO.

The preparation of sulphur by the CLAUS process from a gas containing hydrogen sulfide is industrially well known. It consists in a controlled oxidation of the hydrogen sulfide by oxygen or air, the said oxidation being prolonged by contact with a catalyst. The gas containing hydrogen sulfide, further called acid gas, is led into a thermal reaction stage in which a third of the hydrogen sulfide is transformed into $SO_2$ in the presence of oxygen or air and a determined quantity of sulphur is formed. The gaseous reaction mixture issuing from the thermal reaction stage is thereafter subjected to indirect cooling in order to recover the calories contained therein and to produce steam and then the said cooled mixture is directed to a condensation stage in which the sulphur contained in the gaseous mixture is separated by condensation. In order to further enhance the sulphur production, which at this step is still very incomplete, the gaseous mixture issuing from the condensation stage is reheated, then led to one or several catalytic reaction stages containing a suitable catalyst, called CLAUS catalyst, in whose contact $SO_2$ reacts with $H_2S$ to form a further quantity of sulphur. The catalytic conversion usually requires several successive catalytic stages, namely a primary catalytic stage, operating at a temperature comprised between 200° C. and 460° C., followed by one or several catalytic stages operating at a temperature comprised between the sulphur dew point and 300° C. and normally at a temperature lower than that prevailing in the primary catalytic stage, each catalytic stage being preceded by a heater for the gaseous mixture to be treated and followed by a condensation zone in which the sulphur formed in separated. The residual gases issuing from the last catalytic reaction stage, which still contain small quantities of sulphur compounds such as $SO_2$, $H_2S$, $CS_2$, COS, sulphur vapour and/or vesicular sulphur, possibly pass into a purification stage, for example, an additional catalytic zone containing a CLAUS type catalyst or other, operating at a temperature lower than the sulphur dew point and periodically subjected to regeneration, the said purification stage further retaining a large proportion of sulphur compounds present in the said residual gas, then the purified residual gases being directed towards an incineration stage to be thereafter discharged into the atmosphere.

The acid gas led to the thermal reaction stage, in addition to $H_2$, contains $CO_2$ and possibly hydrocarbons. In the thermal reaction stage, which operates at high temperatures in the range of 1.000° C. to 1.550° C., the hydrogen sulfide is subjected not only to a controlled combustion to $SO_2$, which then reacts with $H_2S$ to form a given quantity of sulphur but is also thermally decomposed into sulphur and hydrogen; this decomposition and thereafter the quantity of hydrogen formed, increasing with temperature rise. This liberated hydrogen reacts, furthermore, on $CO_2$ present in the acid gas containing $H_2S$ or produced in the thermal reaction stage by combustion of the hydrocarbons which may be contained in the acid gas, to form CO and water. The gaseous reaction mixture issuing from the thermal reaction stage thus contains a given proportion of hydrogen and CO. These compounds pass through the various catalytic stages without being subject to transformation and are only slightly oxidized in the thermal incineration step, or even not at all if the incineration is carried out at temperatures lower than 500° C. Thus for a CLAUS unit producing 1.000 tons of sulphur per day, according to the herein-above mentioned process from an acid gas containing by volume 81% $H_2S$, 1% hydrocarbons, the remainder being $CO_2$, the fumes discharged into the atmosphere, after incineration of the residual gases issuing from the catalytic reactions stage(s) or the subsequent purification stage, if one is foreseen, contain 3.100 $Nm^3/h$ hydrogen and 780 $Nm^3/h$ CO; this corresponds to a calorific energy loss of about $40 \times 10^9$ joules per hour.

The present invention proposes an improved process for the production of sulphur from a gas containing $H_2S$, $SO_2$ and at least one compound selected from $H_2$ and CO, and especially from a gaseous mixture obtained by carrying out controlled oxidation, at high temperature in the range of 1.000° C. to 1.550° C., of a gas containing $H_2S$, which allows, without interrupting the CLAUS reaction of sulphur production from $H_2S$ and $SO_2$, and without heavy investment, a correct oxidation of $H_2$ and CO compounds during the primary catalytic phase to be ensured and the recovery of an energy complement corresponding to the energy liberated by this oxidation, the energy recovery being obtained in the form of a supplementary steam production during the condensation of the sulphur present in the gases issuing from the catalytic stage.

The improvement according to the invention of the process for the production of sulphur, with increased energy recovery, from a gas containing $H_2S$, $SO_2$ and, furthermore, at least one compound selected from among $H_2$ and CO, in which the said gas is caused to pass through a CLAUS catalyst contained in a primary catalytic stage operating at between 200° C. and 460° C., in order to form sulphur by reaction of $H_2S$ on $SO_2$, and the reaction mixture issuing from the said stage is subjected to an indirect heat exchange with water in order to condense the sulphur contained in said mixture, and produce steam, is characterized in that at least the final one eighth of the catalyst volume passed through by the gas in the primary catalytic stage consists of a composite catalytic mass formed by a refractory oxide matrix promoting the CLAUS reaction, on which is fixed at least one transition metal, and in that the contacting of the gas with the composite catalytic mass is carried out at a temperature above 300° C., so as to produce oxidation of hydrogen and CO.

The quantity of composite catalytic mass present in the primary catalytic stage can range from an eighth to the total of the overall quantity of the catalyst contained in the said stage. However, for economic reasons, the quantity of the composite catalytic mass does not represent more than 60% of the overall quantity of the catalyst used in the primary catalytic stage.

According to one embodiment of the invention, the gas contains $H_2S$, $SO_2$ and $H_2$ and/or CO, passes firstly through a current CLAUS catalytic mass located in a first catalytic reactor and then through the composite catalytic mass contained in a second catalytic reactor located downstream from the first reactor, the first and second reactor assembly constituting the primary catalytic stage.

According to another embodiment of the invention, the gas containing $H_2S$, $SO_2$ and $H_2$ and/or CO, passes firstly through a current CLAUS catalyst then through the composite catalytic mass, the said composite catalytic mass being located downstream from and adjacent to the CLAUS catalyst in the single reactor constituting the primary catalytic stage.

In one or other of these embodiments of the invention, the current CLAUS catalyst/composite catalytic mass ratio by weight is advantageously comprised between 1:1 and 8:1; and is preferably comprised between 1:1 and 4:1.

Contact time of the gas containing $H_2S$, $SO_2$, $H_2$ and/or CO with the composite catalytic mass, which depends on the volume of the catalytic mass passed through by the said gas and thus on the quantity of composite catalytic mass present in the primary catalytic stage, and also on the flow-rate of the gas through the said mass, can vary fairly widely according to whether the composite catalytic mass has an essential role of catalysing the oxidation or the transformation of the $H_2$ and CO compounds or whether it must also play an active role as a CLAUS catalyst for the reaction of $SO_2$ on $H_2S$. Contact times comprised between 0.5 and 8 seconds generally give satisfactory results.

In the above-mentioned embodiments according to the invention for which the gas containing $H_2S$, $SO_2$, $H_2$ and/or CO passes firstly through a current CLAUS catalyst before passing through the composite catalytic mass, contact times tc and tm of the said gas, on the one hand, with the current CLAUS catalyst and, on the other hand, with the composite catalytic mass, are more especially comprised between 1.5 and 8 seconds for tc and 0.5 to 3 seconds for tm and such that the tc:tm ratio is comprised between 1:1 and 8:1 and preferably between 1:1 and 4:1. These contact times values are given for standard pressure and temperature conditions.

Within the scope of the present invention is meant by current CLAUS catalyst, any catalyst normally used to enhance the CLAUS reaction of the formation of sulphur by reaction of $SO_2$ on $H_2S$. The CLAUS catalysts particularly appropriate for this purpose are selected from the group formed by aluminas, bauxite, titanium or zirconium oxides and especially $TiO_2$ and $ZrO_2$, silicas, natural or synthetic zeolites and mixtures of such products.

As mentioned herein-above, the composite catalytic mass is constituted by a refractory oxide matrix promoting the CLAUS reaction on which is fixed at least one transition metal compound. The matrix of the said catalytic mass can be particularly selected from the above-mentioned group of current CLAUS catalysts, i.e. from among aluminas, bauxite, titanium or zirconium oxides, silicas, zeolites and mixtures of such products. The transition metal compound(s) present on the said matrix is advantageously selected from among the compounds, particularly oxides, sulphides, mineral or organic acid salts such as, for example, sulfates, nitrates, phosphates, acetates, of transition metals of Groups I, II, V, VI and VIII of the Periodic Classification of Elements, the said compounds being more particularly cobalt, molybdenum, tungsten, vanadium, chromium or nickel compounds.

Preferred composite catalytic masses are those comprising a matrix selected from among aluminas, titanium oxides and mixtures of such oxides, on which is fixed a cobalt and/or molybdenum compound.

The composite catalytic mass contains a quantity of transition metal corresponding to 0.3 to 20%, and preferably 0.5 to 15% by weight of metal with respect to the weight of the calcinated composite catalytic mass.

The gas containing $H_2S$, $SO_2$ and $H_2$ and/or CO, which is treated according to the invention, can have a $H_2$ and/or CO content varying within fairly wide limits. The said content can be comprised between 0.3 and 10%, and is preferably comprised between 0.5 and 6% by volume. By "content in $H_2$ and/or CO" of the above-mentioned gas is meant the $H_2$ or CO content when only one of the two compounds is present in the said gas or the overall $H_2$ and CO content when both compounds are contained in the gas.

The gas treated according to the invention, which contains $H_2S$, $SO_2$, $H_2$ and/or CO can have diverse origins. In particular, such gas can be that issuing from the thermal reaction stage of a CLAUS sulphur unit, into which is fed a gas containing $H_2S$ as the only sulphur compound and said $H_2S$ is subjected to a controlled combustion, at a temperature comprised between 1.000° and 1.550° C., by means of a determined air deficiency in order to produce sulphur and obtain a $H_2S:SO_2$ molar ratio having an appropriate value, especially equal to about 2:1, in the effluents of the said stage, the said effluents being cooled by indirect heat exchange with water in order to condense the sulphur that they contain and produce steam. The gas constituted by the sulphur-free effluents forms the gas containing $H_2S$, $SO_2$, $H_2$ and/or CO, which after having been heated to an appropriate temperature is introduced into the primary catalytic stage.

According to the invention, the part of the primary catalytic stage containing the composite catalytic mass, operates at temperatures comprised between 300° and 460° C., the said temperatures being selected more particularly between 320° C. and 430° C. The part of the primary catalytic step containing the current CLAUS catalyst operates at temperatures which are comprised between 200° and 460° C. and are sufficient for the gas containing $H_2S$, $SO_2$, $H_2$ and/or CO issuing from the current CLAUS catalyst to enter into contact with the composite catalytic mass has a temperature comprised between 300° and 460° C., and advantageously between 320° and 430° C. In order to establish appropriate temperatures in the part of the primary catalytic stage containing the current CLAUS catalyst, the gas containing $H_2S$, $SO_2$ $H_2$ and/or CO is led into contact with the said CLAUS catalyst, at a temperature comprised between 200° and 460° C. and such that, taking into consideration the calories liberated by the reaction of $SO_2$ on $H_2S$ in contact with the current CLAUS catalyst, the said gas has a temperature comprised between 300° and 460° C., and more particularly comprised between 320° and 430° C. when it enters into contact with the composite catalytic mass. More particularly, the gas containing $H_2S$, $SO_2$, $H_2$ and/or CO led into contact with the current CLAUS catalyst has a temperature ranging from 250° to 430° C. and even higher in this range when the $H_2S$ and $SO_2$ contents of the gas are smaller. Indeed, the contribution to the maintenance of the temperatures made by the calories resulting from the reaction of $SO_2$ on $H_2$ is even less important when the $H_2S$ and $SO_2$ contents are smaller.

The gaseous effluent, which issues from the primary catalytic stage and was treated in order to condense and separate the sulphur contained therein with accompanying water vapour production, can be caused to pass in at least one supplementary catalytic stage containing a CLAUS catalyst and operating at temperatures comprised between sulphur dew point and 300° C. and lower than temperatures prevailing in the primary catalytic stage, with the purpose of producing fresh quantities of sulphur. The gases issuing from the said supplementary catalytic stage are treated in order to condense and separate the sulphur contained therein, especially by indirect heat exchange with water and steam production, and thereafter subjected to incineration in the presence of a sufficient quantity of gas containing free oxygen, especially in the presence of air, with the purpose of transforming into $SO_2$ all the sulphur compounds remaining in the residual gases issuing from the supplementary catalytic stage before discharging said gases into the atmosphere. When several supplementary catalytic stages are used, these are positioned in series and the gases issuing from each of the said stages are treated, for example, as indicated herein-above in order to condense and separate the sulphur contained therein then the treated gases are heated to an appropriate temperature comprised between sulphur dew point and 300° C. to be thereafter fed into the following supplementary catalytic stage, the residual gases issuing from the final catalytic stage being subjected to incineration, after separation from the sulphur they contain.

Before their incineration, the residual gases issuing from the sole supplementary catalytic stage—or the final supplementary catalytic stage when several of these stages are used—can be caused, after having been treated as indicated herein-above to separate the sulphur, to pass into a complementary purification stage in order to further reduce their sulphur compounds content. The complementary purification stage can comprise, for example, an additional catalytic zone containing a CLAUS catalyst which functions at a temperature lower than sulphur dew point and which is periodically subjected to regeneration.

The following examples are given by way of illustration of the invention without in any way limiting the same.

EXAMPLE 1

Operating is carried out in a vertical reactor, acting as the primary catalytic stage, containing a layer of current CLAUS catalyst superposed on a layer of composite catalytic mass. The current CLAUS catalyst was constituted by beads of 4 to 6 millimeters in diameter made of alumina having a specific area of 260 m$^2$/g. The composite catalytic mass comprised a commercial catalyst in the form of beads of about 5 millimeters in diameter and having a specific area of 248 m$^2$/g. This catalyst was constituted by an alumina impregnated with cobalt oxide and molybdenum oxide, and containing 1.75% cobalt and 8% molybdenum expressed in metal weight/total weight of the said calcinated catalyst.

Into the reactor is led, at a flow-rate of 1.000 normal liters/h, a gas having the following composition by volume:

| | |
|---|---|
| $H_2S$ | 9% |
| $SO_2$ | 4.5% |
| $H_2$ | 2% |
| $H_2O$ | 20% |
| $N_2$ | 64.5% |

The gas having the herein-above specified composition passes firstly through the current CLAUS catalyst layer and thereafter through the catalytic mass layer. The volumes of the current CLAUS catalyst and the composite catalytic mass were such that, for the specified flow-rate, contact times of the gas with the current CLAUS catalyst and the composite catalytic mass were, respectively, equal to 4 seconds and 1.5 seconds.

The gas enters into contact with the current CLAUS catalyst at a temperature of 250° C. and into contact with the composite catalytic mass at a temperature of 335° C.

Sulphur yield for the two catalyst assembly was 70%. At the exit of the composite catalytic mass, the hydrogen conversion rate was 60%.

In an identical test carried out using a single catalyst, namely the current CLAUS catalyst with a contact time between the gas and the catalyst of 5.5 seconds, the sulphur yield reached 70% but no hydrogen conversion was observed.

It is also noted that the treatment according to the invention of a gas containing $H_2S$, $SO_2$ and $H_2$ leads, without interrupting the yield of the CLAUS reaction between $H_2S$ and $SO_2$ producing sulphur, to a noticeable hydrogen oxidation, thus allowing an additional energy recovery corresponding to the calories liberated by this oxidation. In the present case this additional energy rose to about $3 \times 10^6$ Joules.

EXAMPLE 2

Operating is carried out in a vertical reactor acting as the primary catalytic stage and containing as catalyst a composite catalytic mass comprising an alumina impregnated with cobalt oxide and molybdenum oxide. This composite catalytic mass, in the form of beads of about 5 millimeters in diameter, had a specific area of 250 m$^2$/g and contained 2% cobalt and 8% molybdenum expressed by metal weight/composite calcinated catalytic mass total weight.

Into the reactor is led, with a flow-rate of 1.000 normal liters/h, a gas having the following composition by volume:

| | |
|---|---|
| $H_2S$ | 2.5% |
| $SO_2$ | 1.25% |
| $H_2O$ | 27% |
| $H_2$ | 2.10% |
| $N_2$ | 67.15% |

The volume of the composite catalytic mass was such that, for the specified flow-rate, contact time of the gas with the said catalytic mass was 1.7 seconds.

The gas entered into contact with the composite catalytic mass at a temperature of 330° C., the said temperature being maintained throughout the duration of the reaction.

The sulphur yield of the reaction was 70% and the hydrogen conversion yield rate rose to 80%.

In a test carried out under identical operating conditions, but while replacing the composite catalytic mass with the same volume of current CLAUS catalyst comprising an alumina, in the form of beads of 4 to 6 millimeters in diameter, having a specific area of 260 m$^2$/g, the sulphur yield was 70% and no hydrogen conversion was observed.

EXAMPLE 3

Using a CLAUS sulphur unit producing 1.000 tons of sulphur per day from an acid gas containing by volume 81% H$_2$S and 16% CO$_2$, the remainder being constituted by methane and water vapour, two types of tests were carried out, operating as indicated herein-below.

The sulphur unit comprised the usual elements disposed in series, namely in the order in which the gas to be treated passes through them: a thermal reactor equipped with a burner for the acid gas and prolonged by a thermal recovery boiler, a first condensor for the separation of sulphur followed by a first heater, a first catalytic converter, a second condensor for the sulphur separation followed by a second heater, a second catalytic converter, a third condenser and finally an incinerator giving off into the atmosphere through a stack.

In the first type of test, carried out according to the invention, the first catalytic converter acted as the primary catalytic stage and contained a layer of current CLAUS catalyst adjacent to a composite catalytic mass so that the gas passing through the first converter passes firstly through the current CLAUS catalyst layer and thereafter through the composite catalytic mass layer. The current CLAUS catalyst was formed from beads of 4 to 6 millimeters in diameter, of an alumina having a specific area of 260 m$^2$/g, whereas the composite catalytic mass comprised beads of 5 millimeters in diameter of an alumina impregnated with cobalt oxide and molybdenum oxide, the said composite catalytic mass having a specific area of 250 m$^2$/g, and containing 1.75% cobalt and 8% molybdenum expressed by metal with respect to the calcinated composite catalytic mass. The second catalytic converter, or supplementary catalytic stage, contained a current CLAUS catalyst constituted from an alumina having the same characteristics as the alumina present in the first converter.

The acid gas containing hydrogen sulfide was fed into the thermal reactor at a flow-rate of 49.866 Nm$^3$/h and a fraction of H$_2$S contained in this acid gas was burned by means of a determined air deficiency corresponding to the obtention of a H$_2$S:SO$_2$ molar ratio of 2:1 in the residual gases issuing from the second converter, i.e. from the final catalytic stage. The temperature in the thermal reactor was maintained at about 1.140° C. by the calories given off by the combustion of the said H$_2$S fraction of the acid gas. The gaseous reaction mixture produced in the thermal reactor passed through the thermal recovery boiler, where it cooled to a temperature of 332° C. while transferring a part of its calories to water to produce steam, then reached the first condenser indirectly cooled by water and in which the gaseous reaction mixture was cooled to 215° C., thus provoking the separation of sulphur by condensation. The gaseous mixture leaving the first condenser was led to the first heater which raises the temperature of said mixture to 288° C. through combustion of acid gas.

The acid gas leaving the first heater had the following composition by volume:

| | |
|---|---|
| H$_2$S | 6.65% |
| CO$_2$ | 5.35% |
| SO$_2$ | 3.37% |
| H$_2$ | 2.53% |
| CO | 0.64% |
| H$_2$O | 25.12% |
| CS$_2$ | 0.10% |
| N$_2$ | 55.89% |
| COS | 0.35% |

This gas reached the first converter with a temperature of 288° C. and passed through the said converter while first reaching the current CLAUS catalyst and thereafter the composite catalytic mass. Contact times of the said gas with the current CLAUS catalyst and thereafter with the composite catalytic mass were, respectively, 4 seconds and 1.5 seconds. The gas entered into contact with the composite catalytic mass at a temperature of 365° C. and exited from the first catalytic converter at a temperature of 388° C.

The gaseous effluent coming from the first converter was led to the second condenser, indirectly cooled by water which produces steam, in which the sulphur contained in the said effluent was separated by condensation at 183° C., the sulphur-free gaseous effluent issuing from the second condenser was heated to a temperature of 230° C., in the second heater, and thereafter fed into the second catalytic converter.

The residual gases leaving the second catalytic converter at 238° C. passed thereafter into the third condensor, also water cooled and lowering the temperatures of said gases to 142° C. in order to condense the sulphur. The sulphur-free residual gases, exiting from the said condenser, were thereafter led into the incinerator operating at a temperature of 540° C., in which the gaseous sulphides still present in small concentrations in the said residual gases were transformed into SO$_2$ and the fumes given off by this incineration were directed towards the stack to the discharged into the atmosphere.

The overall production of sulphur was 96.9%.

In the second type of test, constituting a sample test, the first catalytic converter contained a single type of catalyst, namely a current CLAUS catalyst constituted by alumina used as CLAUS catalyst in the first type of test, the quantity of said alumina corresponding to the obtention of a contact time of 5.5 seconds. The other operating conditions of this second type of test were identical to corresponding conditions of the first type of test.

In the second type of test, or sample test, an overall sulphur production yield of 96.65% is obtained and no hydrogen and CO conversion in the catalytic converters was observed, although the residual gases issuing from the second catalytic converter and directed towards the incinerator still contained 3.100 Nm$^3$/h hydrogen and 783 Nm$^3$/h CO.

In the first type of test corresponding to the invention, the residual gases directed towards the incinerator only contained 1.084 Nm$^3$/h hydrogen and 313 Nm$^3$/h CO, which corresponded to an average conversion rate of 65% for hydrogen and 60% for CO during the passage of the gas containing H$_2$ and CO in the first catalytic converter operating according to the invention. This H$_2$ and CO conversion allows the recovery, in the form of steam produced by the condensor, of additional energy of about 22×10$^9$ Joules/h, which corresponds to a supplementary steam production of about 10 tons/h, i.e. about 8% more than the steam obtained in the sample test for which no H$_2$ and CO conversion is effected during the catalytic conversion.

What is claimed is:

1. In a process for the production of sulfur, with increased energy recovery, from a gas containing H$_2$S and SO$_2$, and at least one compound selected from H$_2$ and CO, wherein the gas passes through a CLAUS catalyst in a primary catalytic stage operating at a temperature between 200° C. and 460° C. to form sulphur by reaction of SO$_2$ with H$_2$S, and the reaction mixture from the primary stage is cooled by indirect heat exchange with water to condense sulfur contained in the mixture and produce steam, the improvement which comprises:

passing the gas containing $H_2$ and CO through a CLAUS reaction catayst in the primary catalytic stage wherein at least the final one eighth of the catalyst volume comprises a composite catalyst which comprises a refractory oxide CLAUS reaction catalyst having fixed thereon from 0.3 to 20 percent by weight, of the composite catalyst, of at least one transition metal compound of metals selected from the group consisting of Groups I, II, V, VI and VIII of the PERIODIC CLASSIFICATION OF ELEMENTS at a temperature above 300° C., to achieve $H_2$ and CO oxidation.

2. An improved process according to claim 1, wherein the composite catalyst comprises the total volume of the catalyst contained in the primary catalytic stage.

3. An improved process according to claim 1, wherein the composite catalyst comprises not more than 60% of the overall quantity of the catalyst in the primary catalytic stage.

4. An improved process according to claim 1, wherein the gas containing $H_2S$, $SO_2$, $H_2$ and/or CO passes first through a CLAUS reaction catalyst, contained in a first catalytic reactor, then through the composite catalytic mass, contained in a second catalytic reactor downstream from the first reactor, the first and second reactor assembly comprising the primary catalytic stage.

5. An improved process according to claim 1, wherein the gas containing $H_2S$, $SO_2$, $H_2$ and/or CO passes first through a CLAUS reaction catalyst, then through the composite catalytic mass, the said composite catalytic mass being downstream from and adjacent to the CLAUS reaction catalyst in a single reactor comprising the primary catalytic stage.

6. An improved process according to claim 4, wherein the quantity of CLAUS reaction catalyst/quantity of composite catalytic mass weight ratio is between 1:1 and 8:1.

7. An improved process according to claim 6 wherein the quantity of CLAUS reaction catalyst/quantity of composite catalytic mass weight ratio is between 1:1 and 4:1.

8. An improved process according to claim 1, wherein the contact time of the gas containing $H_2S$, $SO_2$, $H_2$ and/or CO with the composite catalyst mass is between 0.5 and 8 seconds.

9. An improved process according to claim 4, wherein the contact time of the gas containing $H_2S$, $SO_2$, $H_2$ and/or CO with the composite catalyst mass is between 0.5 and 8 seconds.

10. An improved process according to claim 5, wherein the contact time of the gas containing $H_2S$, $SO_2$, $H_2$ and/or CO with the composite catalyst mass is between 0.5 and 8 seconds.

11. An improved process according to claim 4, wherein the tc and tm contact times of the gas containing $H_2S$, $SO_2$, $H_2$ and CO, with the CLAUS reaction catalyst and with the composite catalytic mass are between 1.5 and 8 seconds of tc and 0.5 to 3 seconds for tm and such that the tc:tm ratio is comprised between 1:1 and 8:1.

12. An improved process according to claim 1, wherein the composite catalytic mass has a matrix selected from the group consisting of alumina, bauxite, titanium oxide, zirconium oxide, silica, zeolite and mixtures thereof.

13. An improved process according to claim 1, wherein the transition metal present on the composite catalytic mass is selected from the group consisting of cobalt, molybdenum, tungsten, vanadium, chromium or nickel compounds and mixtures thereof.

14. An improved process according to claim 1, wherein the composite catalytic mass comprises a matrix selected from the group consisting of alumina, titanium oxide, and mixtures thereof having fixed thereon a compound selected from the group consisting of compounds of cobalt, molybdenum, and mixtures thereof.

15. An improved process according to claim 1, wherein the composite catalytic mass contains a transition metal in an amount of from 0.5 to 15% by weight of the calcined composite catalytic mass.

16. An improved process according to claim 1, wherein the gas containing $H_2S$, $SO_2$, $H_2$ and/or CO has a $H_2$ and/or CO content between about 0.3 and 10% by volume.

17. An improved process according to claim 1, wherein the gas containing $H_2S$, $SO_2$, $H_2$ and/or CO comprises gas from the thermal reaction stage of a CLAUS sulphur unit, in which a gas containing $H_2S$ is subjected to a controlled combustion, at a temperature between 1,000° and 1,550° C., with a controlled air deficiency, wherein the effluents of the combustion are subjected to indirect heat exchange with water in order to condense the sulphur contained therein.

18. An improved process according to claim 1, wherein the gaseous effluent from the primary catalytic stage which was cooled to condense and separate the sulphur contained therein with accompanying steam production, is passed to at least one supplementary catalytic stage containing a CLAUS reaction catalyst and operating at temperatures between the sulphur dew point and 300° C., and lower than the temperatures prevailing in the primary catalytic stage, and in that residual gases leaving the said supplementary catalytic stage are treated in order to condense and separate the sulphur contained therein, and thereafter subjected to incineration.

19. An improved process according to claim 1, wherein the gaseous effluent is treated to condense and separate sulphur contained therein with accompanying steam production, is passed through several successive supplementary catalytic stages, each operating at temperatures between the sulphur dew point and 300° C., and the gases from each of the said stages being treated, to condense and separate sulphur contained therein, then heated and passed to a supplementary catalytic stage, the residual gases leaving the final catalytic stage being incinerated after separation of sulphur contained therein.

20. An improved process according to claim 1, wherein a controlled air deficiency for the controlled combustion of $H_2S$ in the thermal reaction zone provides an $H_2S:SO_2$ molar ratio in the residual gases from the final catalytic stage of about 2:1.

21. An improved process according to claim 18 wherein, before incineration, the residual gases from the final catalytic stage are passed through a complementary purification stage after having been treated to separate sulphur therefrom.

22. An improved process according to claim 1, wherein the portion of the primary catalytic stage containing the composite catalytic mass operates at temperatures between about 300° and 460° C.

23. An improved process according to claim 3, wherein the portion of the primary catalytic stage containing the CLAUS reaction catalyst operates at temperatures between about 200° and 460° C. to raise the temperature of the gas containing $H_2S$, $SO_2$, $H_2$ and/or CO entering the composite catalytic mass to between about 300° and 460° C.

24. An improved process according to claim 1, wherein the portion of the primary catalytic stage containing the composite catalytic mass operates at temperatures between about 320° and 430° C.

25. An improved process according to claim 3, wherein the portion of the primary catalytic stage containing the CLAUS reaction catalyst operates at temperatures between about 200° and 460° C. to raise the temperature of the gas containing $H_2S$, $SO_2$, $H_2$ and/or CO entering the composite catalytic mass of between 320° and 430° C.

26. An improved process according to claim 1, wherein the gas containing $H_2S$, $SO_2$, $H_2$ and/or CO has a $H_2$ and/or CO content between about 0.5 and 6% by volume.

* * * * *